UNITED STATES PATENT OFFICE.

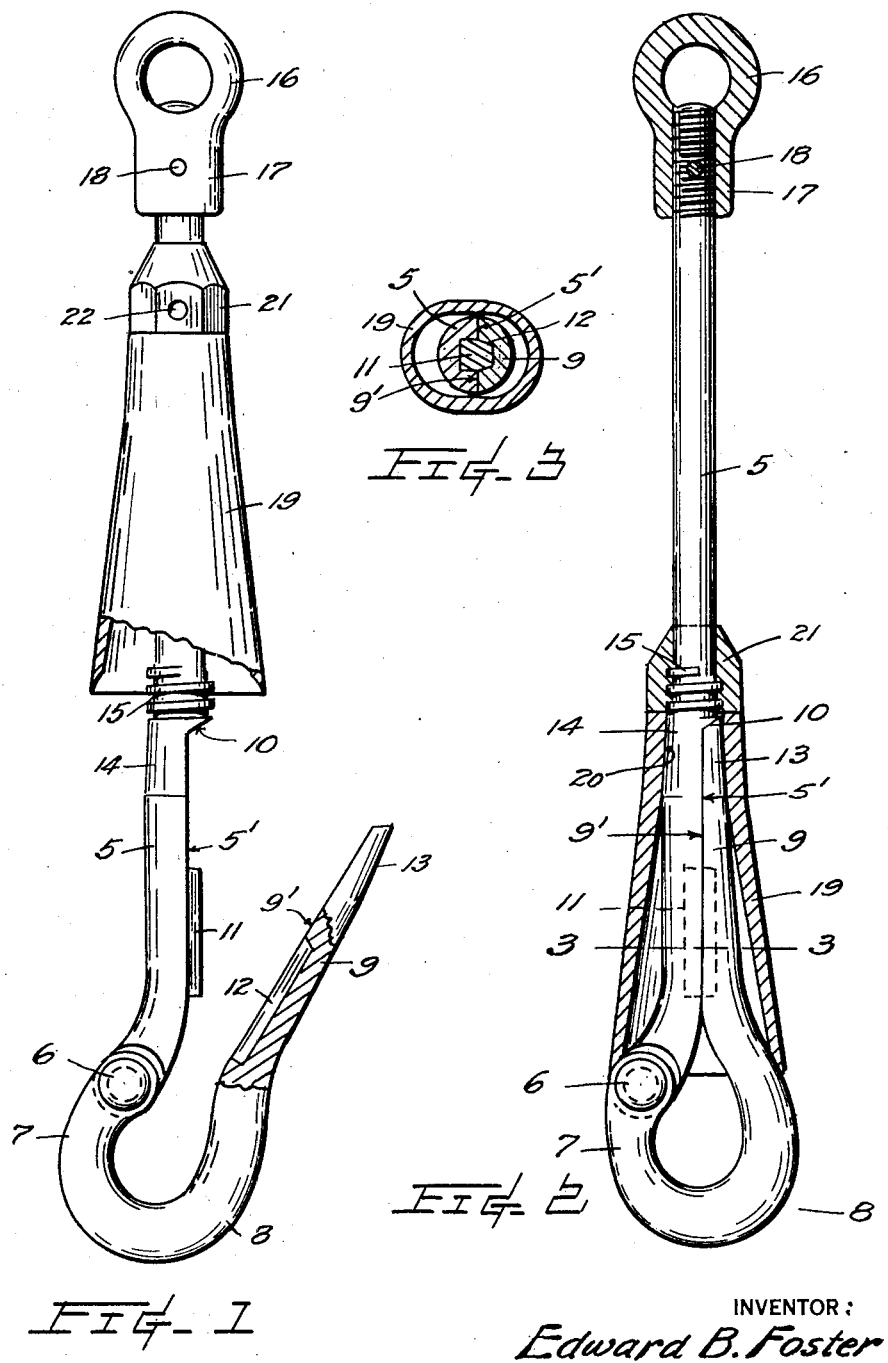

EDWARD B. FOSTER, OF QUARTZSITE, ARIZONA.

HOISTING DEVICE.

1,386,561.  Specification of Letters Patent.  Patented Aug. 2, 1921.

Application filed July 17, 1920. Serial No. 396,968.

*To all whom it may concern:*

Be it known that I, EDWARD B. FOSTER, a citizen of the United States, residing at Quartzsite, in the county of Yuma and State of Arizona, have invented certain new and useful Improvements in Hoisting Devices, of which the following is a specification.

This invention relates to safety hoisting devices designed more particularly for use in hoisting material in mine shafts and for other similar purposes.

The object of the invention is the provision of a hook-like device from which the accidental dislodgement of a load carrying sling, bucket bail, etc., is positively prevented.

A further object of the invention is to provide a hook structure which is sheathed to afford no laterally protruding parts to be caught by projectives from a shaft wall.

With these and other objects in view, the invention consists in the novel construction, adaptation and combination of parts, hereinafter described and claimed.

In the accompanying drawings, Figure 1 is a view, partly in side elevation and partly in section, of devices embodying the present invention, the hook being shown in its open position.

Fig. 2 is a similar view, illustrating the hook closed. Fig. 3 is a detail sectional view through 3—3 of Fig. 2.

In said drawings, the numeral 5 designates a shank which is hingedly connected at its lower end by a pin or bolt 6 to the arm 7, of a looped member 8 which constitutes the hook proper of my device.

The other arm 9 of said hook member serves as the hook bill and is made relatively long so as to extend a distance above the hinge pin 6 when the bill is brought against the shank 5 as shown in Fig. 2. To accommodate the hook bill 9 the shank 5 is cut away to provide below, a shoulder 10 recessed surface $5^1$ against which fits a plane surface $9^1$ provided at the inner side of the bill 9.

The bill and shank parts as shown in Fig. 3 are each of a substantially semi cylindrical form. Rigidly secured to or formed integral with the shank 5 is a block 11 which protrudes from the face $5^1$ to engage within a recess 12 provided in the hook part 9.

The upper portion 13 of the hook part or bill 9 and the adjacent part 14 of the shank are formed to provide a conical section when the parts are together (Fig. 2).

Above such conical section the shank 5 is provided with screw threads 15.

At the upper end of the shank is provided a ring or eye 16 for connecting with a hoisting cable.

As shown, the eye 16 is formed with a tubular coupling element 17 which is internally threaded and screwed upon the threaded extremity of the shank. 18 represents a key or pin engaging in registering holes in the shank and coupling to prevent the latter being accidentally disengaged from the shank.

19 represents a hook-sheath the same being in the form, preferably, in which it is shown in the views and of a length to extend from the upper end of the aforesaid conical section 13—14 to approximately the hinge pin 6. The upper part of the sheath is provided with an internal conical bore 20 to receive the conical section of the hook and maintain the bill 9 in juxtaposed relations with the shank 5.

A nut 21 engageable with the screw threads 15 serves to secure the sheath 19 in its operable position.

The upper portion of the nut and the outer peripheral surface of the sheath taper upwardly, as shown, so as to obviate any possibility of being caught by projections in hoisting operations.

In ordinary practice it is sufficient to screw the nut 21 by turning the same by hand down upon the sheath so as to be easily retracted. The nut may, however, be manipulated by means of a wrench engaging its polygonal periphery or by means of a rod inserted in the nut aperture 22.

It is to be noted that the hook member 8 is connected to the shank 5 at opposite sides of the axis of the latter, that is to say—by the hinge connection 6 and by the block 11 which projects from the shank surface $5^1$. The sheath not only serves to releasably secure the hook member in its engagement with the block 11, but also serves to fend the device when ascending from any projections which the device may encounter.

While I have described the invention as applied to mine applications I do not wish to be understood as limiting myself thereto as it may be advantageously used for other purposes as, for example, in hoisting material from the hold of a ship, or with "choker-lines" so called in hauling logs through the woods.

My improved hook is simple, and inexpensive to construct, convenient to operate and safe to use.

What I claim is,—

1. In a device of the character described, a shank member, provided with screw threads intermediate its length, a block rigid with said shank member and protruding laterally therefrom, a hook member hingedly connected to said shank member at the opposite side of the axis thereof from the protruding portion of said block, said hook member being provided with a recess to engage said block, a sheath sleeved upon the shank member and adapted to secure said hook member in engagement with said block, and a nut engageable with the screw threads of the shank for releasably retaining the sheath in its engaged position with respect to the hook member.

2. In a device of the character described, a shank member provided intermediate its length with screw threads, a hook member hingedly connected to the shank member at one side of the axis of the latter, said hook member extending downwardly from said hinge connection and thence transversely and upwardly, a sheath arranged to engage the free end of the hook member to secure the free end of the hook member to the shank member at the opposite side of the axis thereof from the hinge connection and a nut engageable with said screw threads for releasably securing said free end of the hook member to the shank member.

Signed at Quartzsite, Arizona, this 28th day of June, 1920.

EDWARD B. FOSTER.

Witnesses:
 FAY COOPER,
 H. S. COOPER.